(12) United States Patent
Hsu (10) Patent No.: US 7,855,719 B2
(45) Date of Patent: Dec. 21, 2010

(54) TOUCH INPUT METHOD AND PORTABLE TERMINAL APPARATUS

(75) Inventor: Feng-Wei Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 968 days.

(21) Appl. No.: 11/710,959

(22) Filed: Feb. 27, 2007

(65) Prior Publication Data

US 2008/0204421 A1    Aug. 28, 2008

(51) Int. Cl.
*G06F 3/041* (2006.01)
(52) U.S. Cl. .................... 345/173; 345/157; 463/37; 715/856
(58) Field of Classification Search ......... 345/156–157, 345/169, 173–183, 901, 903; 178/18.01–18.11, 178/19.01–19.07; 463/37–38; 200/512; 715/856–858
See application file for complete search history.

(56) References Cited

U.S. PATENT DOCUMENTS

| 5,821,930 | A | * | 10/1998 | Hansen | ........................ | 715/702 |
| 2002/0067346 | A1 | * | 6/2002 | Mouton | ....................... | 345/173 |
| 2002/0122029 | A1 | * | 9/2002 | Murphy | ....................... | 345/173 |

* cited by examiner

*Primary Examiner*—Lun-Yi Lao
*Assistant Examiner*—Carolyn R Edwards
(74) *Attorney, Agent, or Firm*—Muncy, Geissler, Olds & Lowe, PLLC (57) ABSTRACT

A touch input method applied to a portable terminal apparatus includes the following steps. First, a touch command is received. Then, a pressing area is derived by conducting a range computation according to the touch command. After that, a cursor is produced according to the touch command. Finally, the cursor is optionally disposed inside a predetermined range around the pressing area according to a present location of the pressing area. A portable terminal apparatus applying the touch input method is also disclosed.

11 Claims, 8 Drawing Sheets

TOUCH INPUT METHOD AND PORTABLE TERMINAL APPARATUS

BACKGROUND OF THE INVENTION

1. Field of Invention

The invention relates to a touch input method and a portable terminal apparatus, and, in particular, to a touch input method and a portable terminal apparatus, which are operated according to a cursor produced by touch.

2. Related Art

With the development of technology, many diversified portable terminal apparatuses, such as personal digital assistants (PDAs), smart phones or PDA phones, are available in the market. These portable terminal apparatuses facilitate human life. In addition, the user interfaces of these portable terminal apparatuses are developed to allow the user to conduct an operation. For example, many portable terminal apparatuses have a key-type keyboard through which the user may conduct operations by pressing keys. In addition, a touch user interface may also be provided to facilitate the user's operation by way of touch.

Figure 1:
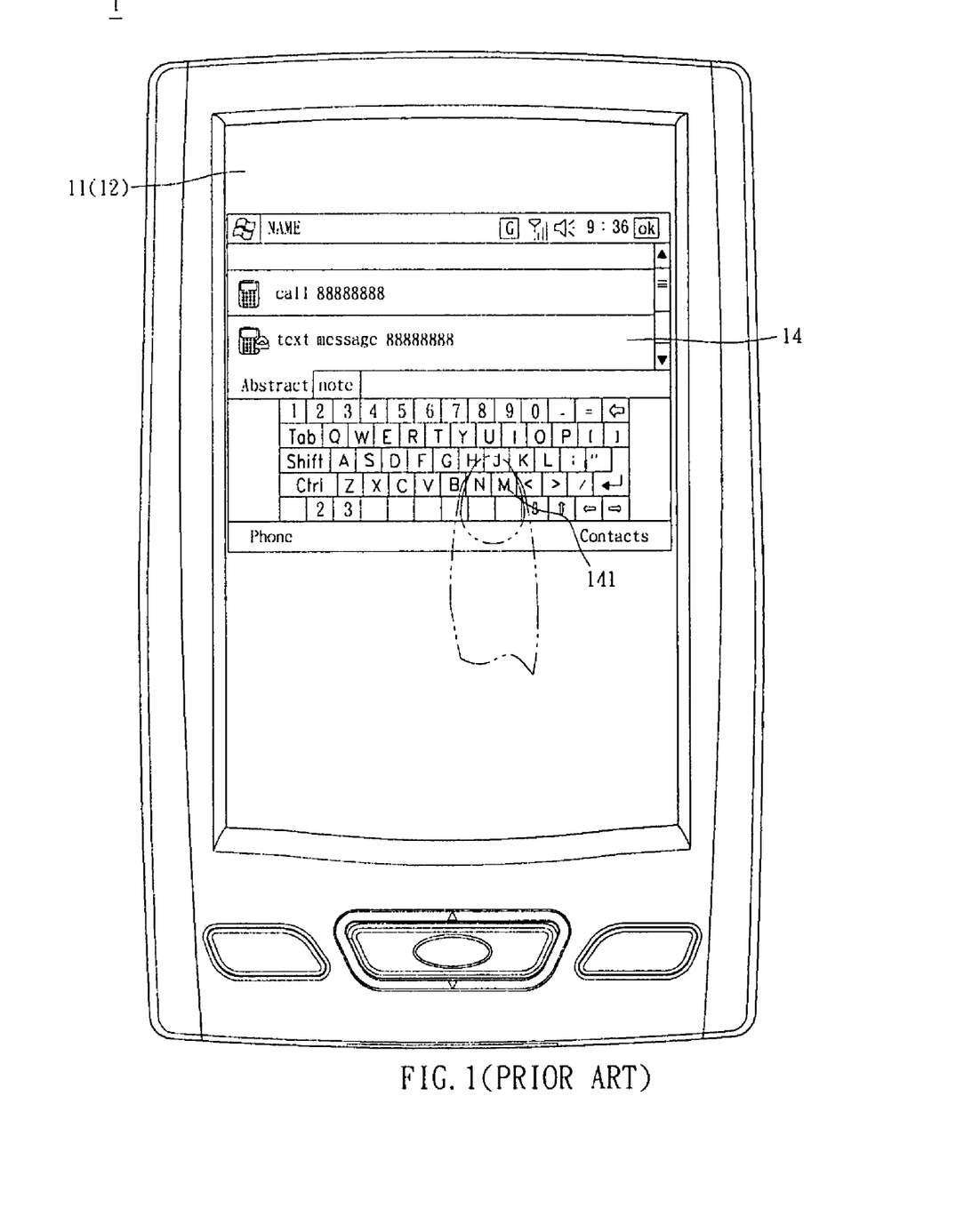
FIG. 1 is a schematic illustration showing a conventional portable terminal apparatus.

Referring to FIG. 1, a portable terminal apparatus 1, such as a personal digital assistant, has one touch panel 11 and one display screen 12. The touch panel 11 and the display screen 12 are disposed in the portable terminal apparatus 1, and the touch panel 11 is disposed over the display screen 12. In addition, the touch panel 11 is exposed from the portable terminal apparatus 1 so that the touch panel 11 may be pressed. The portable terminal apparatus 1 displays an operation frame 14 through the display screen 12, and the operation frame 14 has at least one object 141. For example, as shown in FIG. 1, each key of a software keyboard on the operation frame 14 is an object 141. These objects 141 may be pressed/clicked and thus selected by the user. Although the user may control the portable terminal apparatus 1 using his/her finger to press the touch panel 11, the user cannot easily use his/her finger to press/click the object when the object 141 is smaller than a predetermined area. This is because that many objects 141 may be pressed simultaneously or the object 141 cannot be easily pressed correctly.

Figure 2:
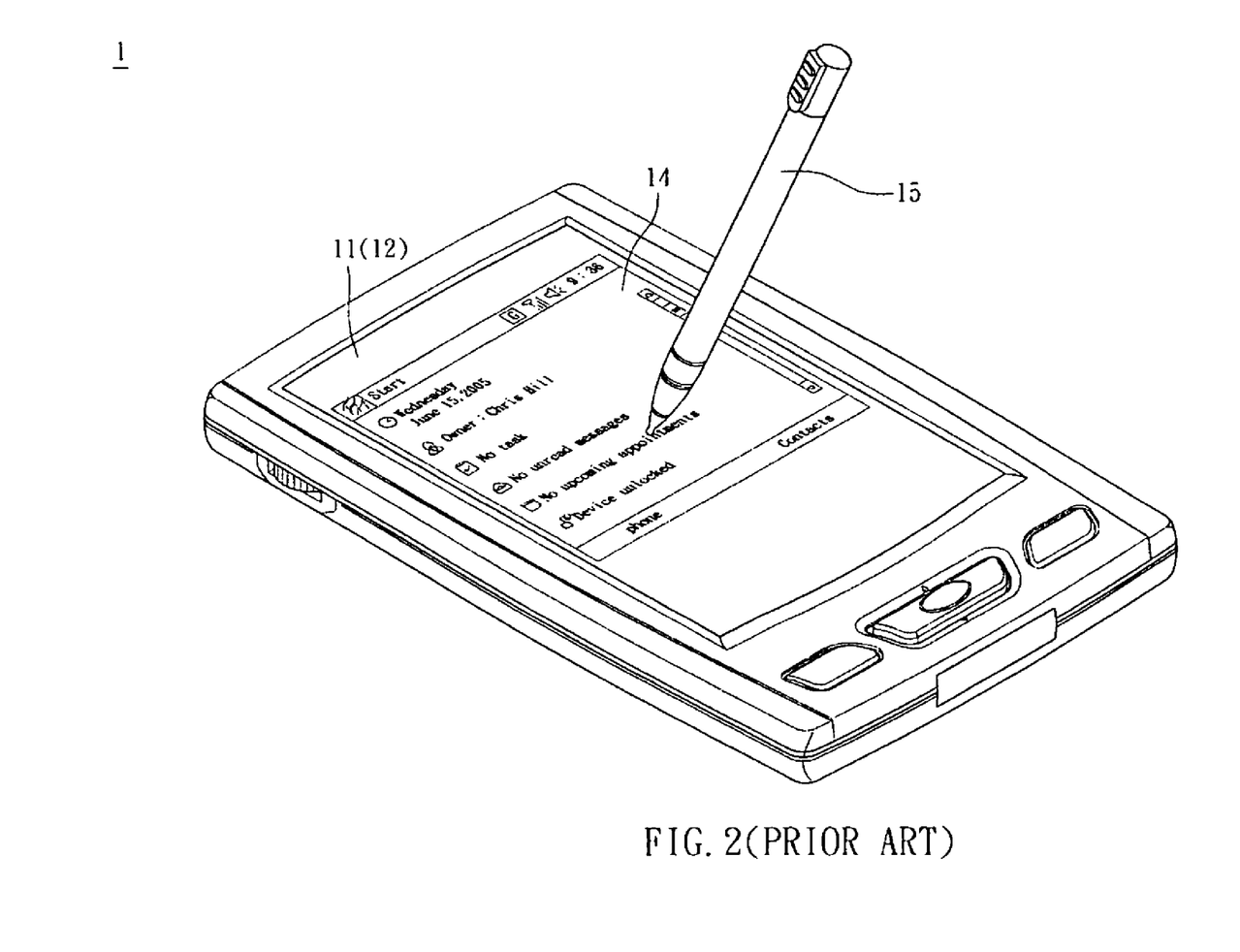
FIG. 2 is a schematic illustration showing the conventional portable terminal apparatus and its stylus.

In addition, as shown in FIG. 2, the portable terminal apparatus 1 further has a stylus 15 having a tip with a very small area, allowing the user to precisely press the touch panel 11 with the stylus 15. Although the stylus 15 can be used conveniently, it also has the following drawbacks. For example, the user has to continuously remove and replace the stylus 15 in a bothersome manner. In addition, the small stylus 15 also tends to be lost. Furthermore, the stylus 15 increases the cost of the portable terminal apparatus 1, and consumes resources.

Thus, it is an important subject of the invention to provide a touch input method to enable the user to use his/her finger to press the desired object easily and precisely without using a stylus so that the usage efficiency can be enhanced.

SUMMARY OF THE INVENTION

In view of the foregoing, the invention is to provide a touch input method, which enables the user to use his/her finger to press the desired object easily and precisely without using a stylus so that the usage efficiency can be enhanced.

To achieve the above, the invention discloses a touch input method, which is applied to a portable terminal apparatus. The touch input method includes the following steps. First, a touch command is received. Then, a pressing area is derived by conducting a range computation corresponding to the touch command. After that, a cursor is produced according to the touch command. Finally, the cursor is optionally disposed inside a predetermined range around the pressing area according to a present location of the pressing area.

To achieve the above, the invention also discloses a portable terminal apparatus including a touch panel module, a computing module, a flat panel display module and a processing module. The touch panel module receives a touch command and accordingly produces a position signal. The computing module is connected to the touch panel module and conducts a range computation according to the position signal so as to derive a pressing area signal corresponding to a pressing area. The flat panel display module is disposed corresponding to the touch panel module, and the processing module is connected to the flat panel display module and the computing module. The processing module transmits a cursor signal to the flat panel display module, and the flat panel display module displays a cursor inside a predetermined range around the pressing area according to the cursor signal.

As mentioned above, the cursor is produced near the pressing area in the touch input method and the portable terminal apparatus according to the invention. Thus, when the user presses and moves the touch panel, the object can be selected precisely and accurately via the cursor. Thus, compared with the prior art, the invention can eliminate difficulties in user-guided touch-controlled cursor movements such as the incapability of precisely pressing/clicking the desired object. In addition, the invention does not require the stylus, so the invention can effectively save the cost, enable the user to operate the device more conveniently, and thus enhance the efficiency of use.

BRIEF DESCRIPTION OF THE DRAWINGS

The invention will be understood more fully from the detailed description given herein below and from the corresponding drawings of the preferred embodiment of the invention, which are examples only, and are not to be limitative of the present invention.

In the drawings.

DETAILED DESCRIPTION OF THE INVENTION

The present invention will be apparent from the following detailed description, which proceeds with reference to the accompanying drawings.

Figure 3:
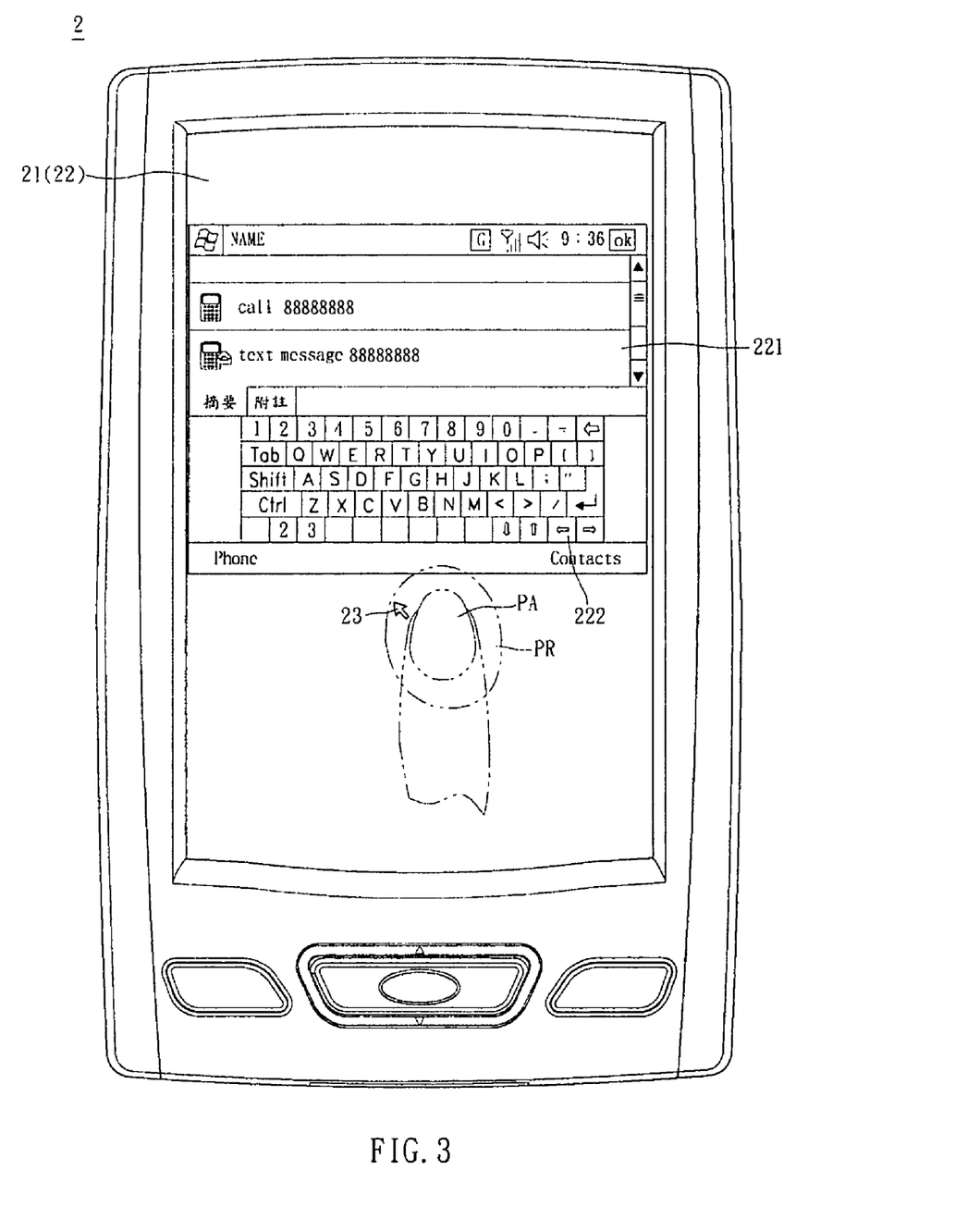
FIG. 3 is a schematic illustration showing a portable terminal apparatus according to a preferred embodiment of the invention.

The touch input method of this embodiment is applied to a portable terminal apparatus 2, which may be a personal digital assistant (PDA), a smart phone or a PDA phone, as shown in FIG. 3. The portable terminal apparatus 2 will be roughly described to facilitate the subsequent descriptions of the touch input method of this embodiment.

The portable terminal apparatus 2 has a touch panel module 21 and a flat panel display module 22. The touch panel module 21 is disposed corresponding to the flat panel display module 22 and exposed from the portable terminal apparatus 2 for the touch operation of the user. The flat panel display module 22 is disposed inside the portable terminal apparatus 2, and displays an operation frame 221. The user may see the operation frame 221 through the touch panel module 21. In addition, the operation frame 221 has a plurality of objects 222 to be selected by the user for execution. Herein, the touch panel module 21 is not restricted to a resistive touch panel, a capacitive touch panel, a surface acoustic wave touch panel or an optics touch panel. The flat panel display module 22 may be, without limitation to, a liquid crystal display (LCD) module or an organic electroluminescent display (OELD) module.

Figure 4:
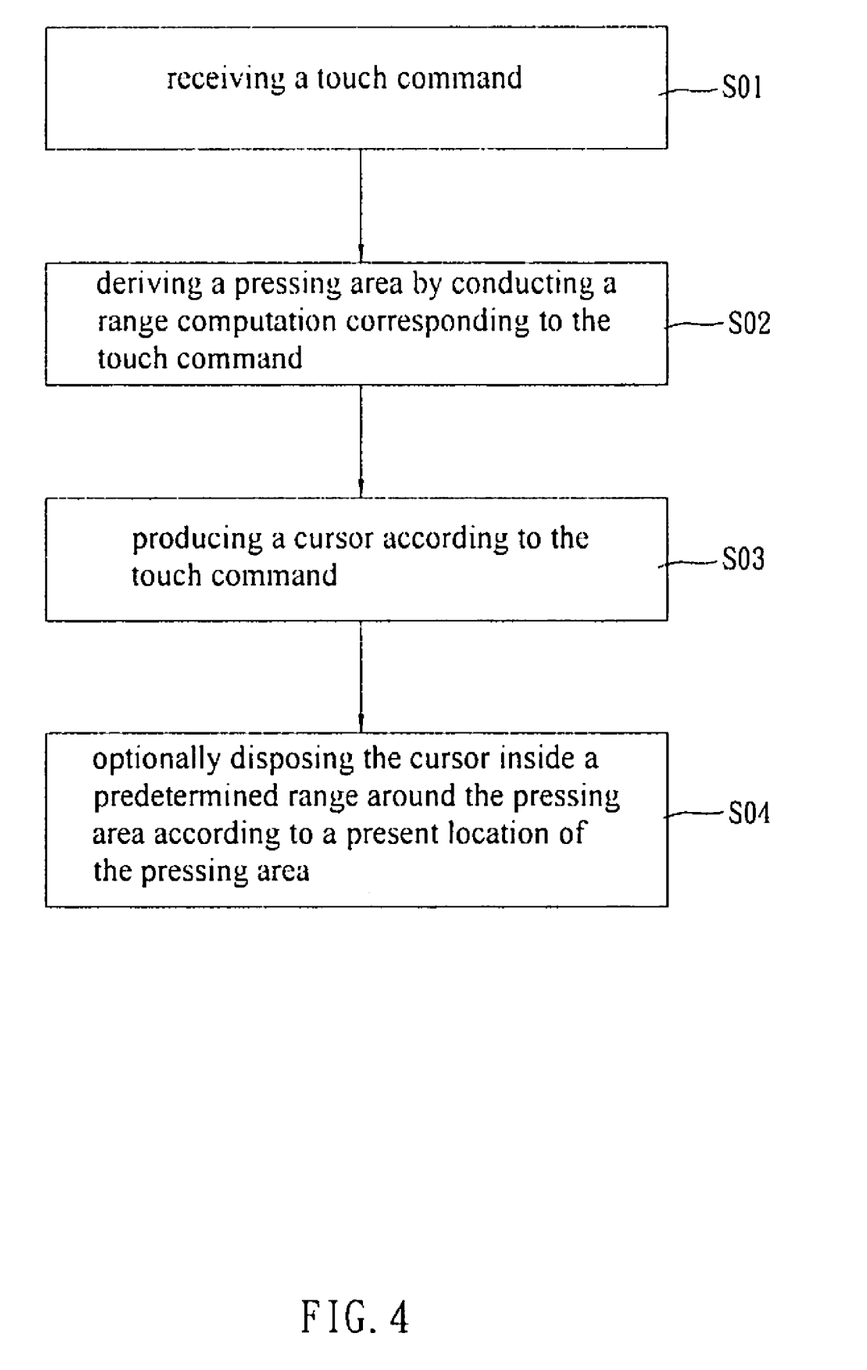
FIG. 4 is a flow chart showing steps of a touch input method according to the preferred embodiment of the invention.

The touch input method of this embodiment will be described in the following. As shown in FIGS. 3 and 4, the touch input method includes the following steps. Step S01 receives a touch command. Step S02 derives a pressing area PA by conducting a range computation corresponding to the touch command. Step S03 produces a cursor 23 according to the touch command. Step S04 optionally disposes the cursor 23 inside a predetermined range PR around the pressing area PA according to a present location of the pressing area PA.

In step S01, when the user uses his/her finger to touch and press the touch panel module 21, the portable terminal apparatus 2 receives the touch command. The touch input method of the invention facilitates the touching and operation via the user's finger, as well as the touching of the touch panel module 21 via another object, such as a stylus, to produce the touch command.

In step S02, the portable terminal apparatus 2 conducts the range computation according to the touch command and derives the pressing area PA. When the user presses the touch panel module 21, a touch driving circuit of the touch panel module 21 produces signals corresponding to the zones pressed by the user. These signals correspond to plural coordinate values, and the portable terminal apparatus 2 computes the pressing area PA according to these coordinate values. In this embodiment, the pressing area PA calculated by the portable terminal apparatus 2 corresponds to the actual zone of the user's finger pressing against the touch panel module 21.

In steps S03 and S04, the portable terminal apparatus 2 produces the cursor 23 according to the touch command, and optionally disposes the cursor 23 inside the predetermined range PR around the pressing area PA. When the user continuously touches the touch panel module 21 and then moves the finger at the same time, the cursor 23 is continuously displayed inside the predetermined range PR via the flat panel display module 22 as well as moved with the movement of the pressing area PA. Herein, if the cursor was displayed in the pressing area PA, the cursor would be blocked by the physical finger during the movement so that the user could not see the cursor. Thus, the creation of the predetermined range PR is necessary to place the cursor inside the predetermined rage PR., but not in the pressing area PA. In addition, the invention does not intend to restrict the shape of the predetermined range PR, and the predetermined range PR even may be changed by the user dynamically. In addition, the cursor 23 may have any patterns or geometric shape.

Figure 5A:
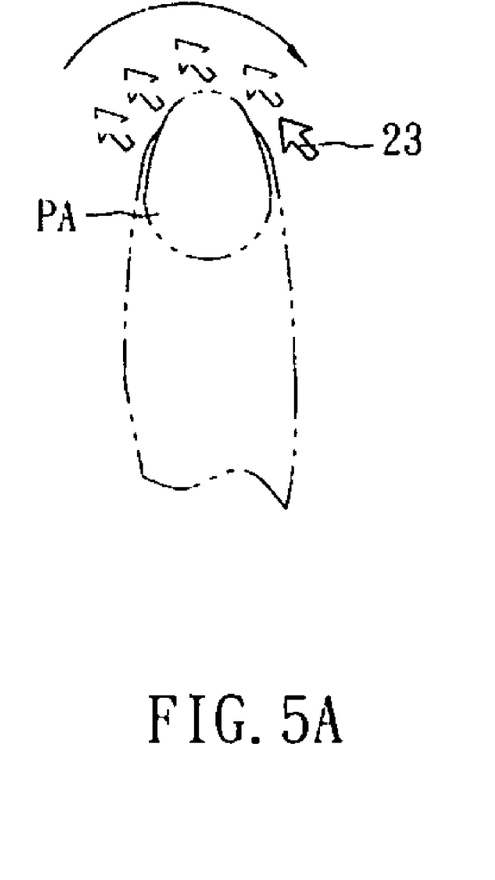
FIGS. 5A and 5B are schematic illustrations showing the touch input method according to the preferred embodiment of the invention, wherein a cursor may be changed dynamically.
Figure 5B:
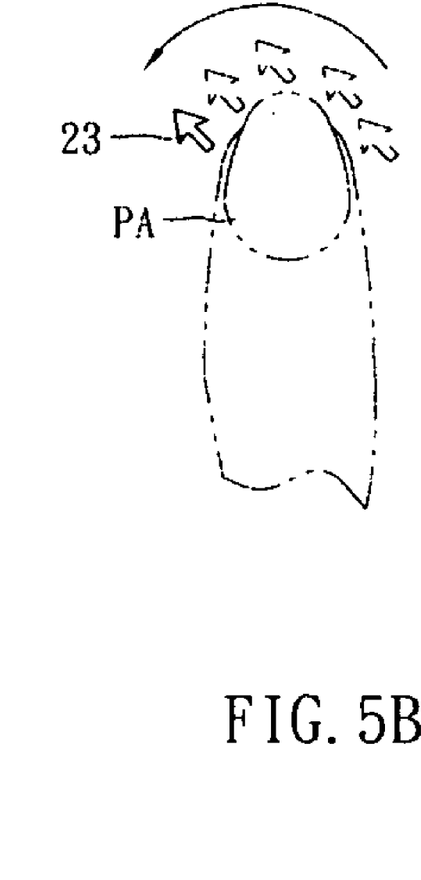

The invention does not particularly restrict the location of the cursor 23 around the pressing area PA as long as the location of the cursor is not blocked by the finger of the user or other pressing objects. In practice, two methods can be adopted to determine the location of the cursor 23 around the pressing area PA. One of the methods is to change the location of the cursor dynamically according to the user, as shown in FIGS. 5A and 5B. As shown in FIG. 5A, the user may change the location of the cursor 23 clockwise. As shown in FIG. 5B, the user can change the location of the cursor 23 counterclockwise. The other method is for the manufacturer to determine the disposition strategy. Of course, the two methods may be used in conjunction with each other, and several disposition strategies will be introduced in the following.

Figure 6:
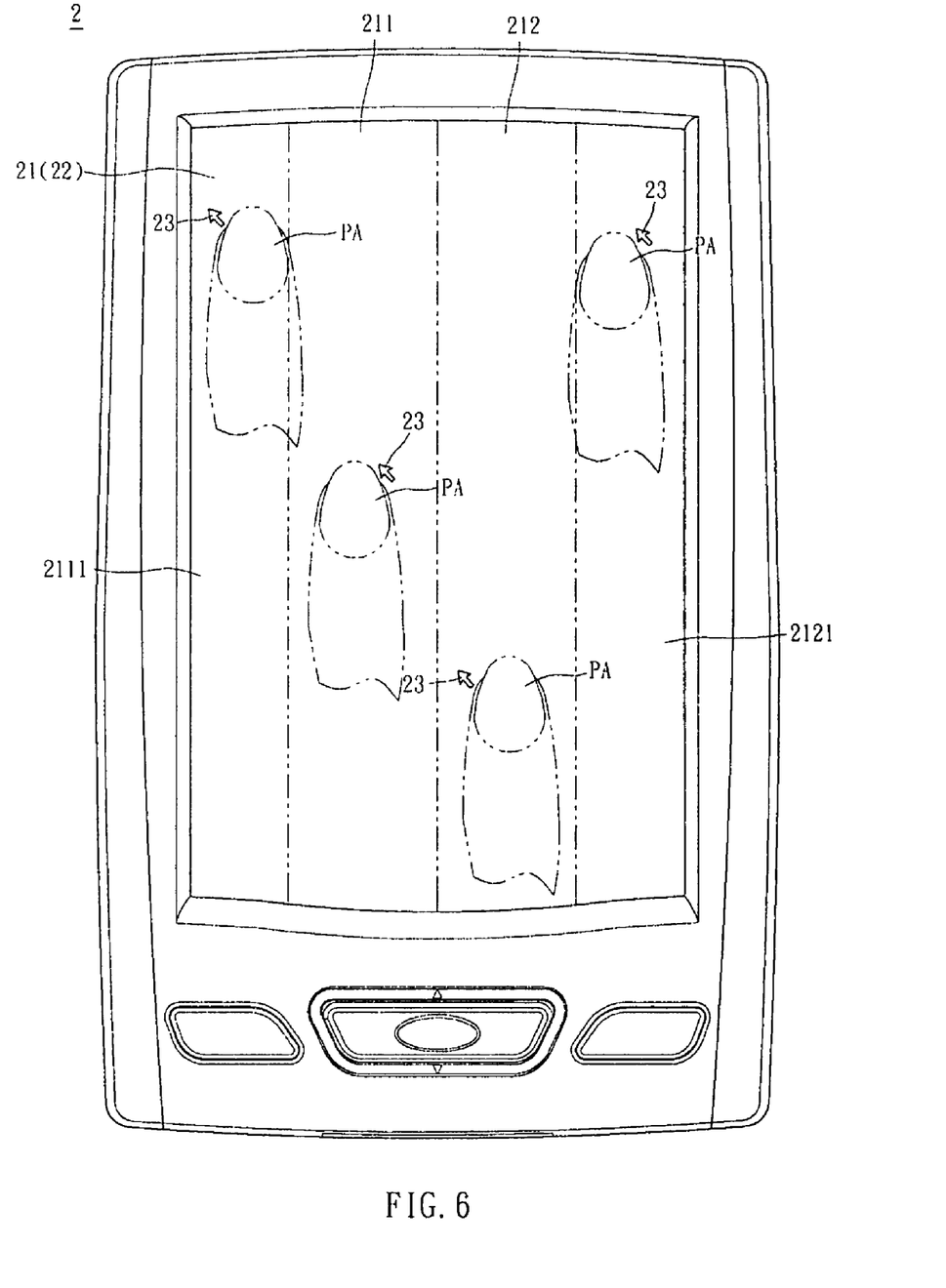
FIG. 6 is a schematic illustration showing a disposition strategy according to the preferred embodiment of the invention.

As shown in FIG. 6, the disposition strategy is to divide the touch panel module 21 into a first predetermined range 211 and a second predetermined range 212. The touch input method of this embodiment further includes the steps of: optionally disposing the cursor 23 on left and right sides around the pressing area PA according to the present location of the pressing area PA; judging whether the pressing area PA is located within the first predetermined range 211 or the second predetermined range 212; disposing the cursor 23 on the right side around the pressing area PA when the pressing area PA is located within the first predetermined range 211; and disposing the cursor 23 on the left side around the pressing area PA when the pressing area PA is located within the second predetermined range 212.

In addition, as shown in FIG. 6, the first predetermined range 211 has a predetermined limit region 2111. The coordinate value within the predetermined limit region 2111 is defined as a predetermined coordinate limit. The second predetermined range 212 also has a predetermined limit region 2121. The coordinate value within the predetermined limit region 2121 is also defined as the predetermined coordinate limit. The touch input method of this embodiment further includes the steps of: judging whether the location of the pressing area PA is within the predetermined coordinate limit of the first predetermined range 211; moving the cursor 23 from the right side around the pressing area PA to the left side when the location of the pressing area PA is within the predetermined coordinate limit; judging whether the location of the pressing area PA is within the predetermined coordinate limit of the second predetermined range 212; and moving the cursor 23 from the left side around the pressing area PA to the right side when the location of the pressing area PA is within the predetermined coordinate limit.

The above-mentioned method enables the user to select the object 222 within the predetermined limit regions 2111 and 2121 of the touch panel module 21 conveniently. Taking the predetermined limit region 2111 as an example, when the finger of the user originally touches the first predetermined range 211, the cursor 23 appears on the right side around the pressing area PA. However, when the finger of the user is moved leftwards to the predetermined limit region 2111 (i.e., the pressing area PA is within the predetermined coordinate limit), the object 222 on the left edge and the top edge of the pressing area PA cannot be selected because of the limitation of the casing of the portable terminal apparatus 2. Thus, when the pressing area PA is within the predetermined coordinate limit, the cursor 23 may be moved from the right side of the pressing area PA to the left side according to the above-mentioned method so that the object 222 within the predetermined limit region 2111 can be selected.

In addition, after the pressing area PA leaves the predetermined limit region 2111, the cursor 23 is also kept on the left side of the pressing area PA. Thus, the object 222 on the interface of the first predetermined range 211 and the predetermined limit region 2111 can be selected conveniently. It is possible to encounter the condition that the cursor 23 is located on the right side of the pressing area PA when the pressing area PA is within the first predetermined range 211, and the cursor 23 is located on the left side of the pressing area PA when the pressing area PA is within the predetermined limit region 2111 so that the object 222 on the interface of the first predetermined range 211 and the predetermined limit region cannot be selected. In addition, the cursor 23 within the second predetermined range 212 and the predetermined limit region 2121 and the cursor 23 within the first predetermined range 211 and the predetermined limit region 2111 have the same rules, and detailed descriptions thereof will be omitted.

Figure 7:
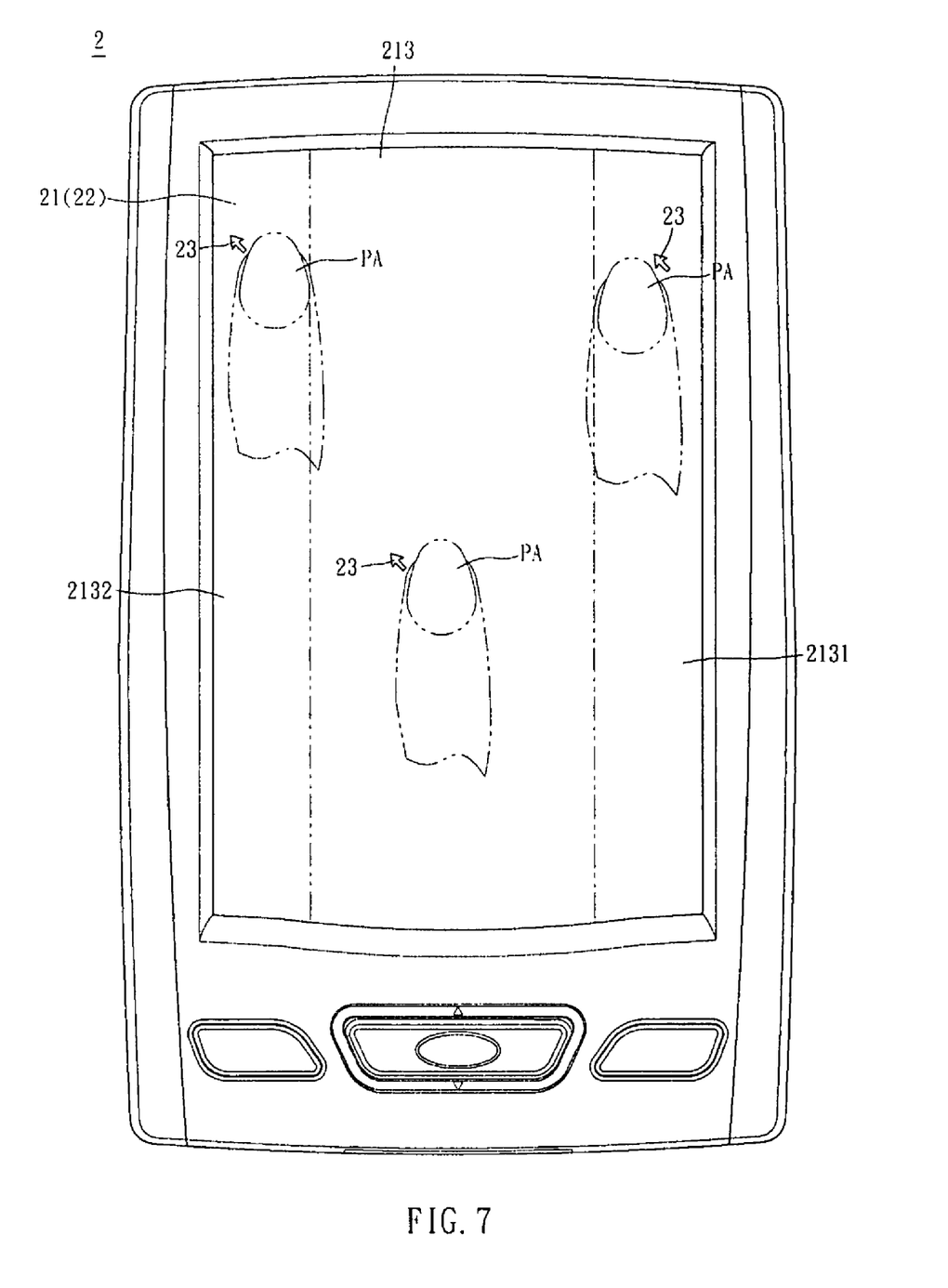
FIG. 7 is a schematic illustration showing another disposition strategy according to the preferred embodiment of the invention.

Another disposition strategy, as shown in FIG. 7, is to divide the touch panel module 21 into a third predetermined range 213 and to dispose predetermined limit regions 2131 and 2132 on two sides of the third predetermined range 213. When the pressing area PA is within the third predetermined range 213, the cursor 23 may be located on the right side or the left side of the pressing area PA. For example, the cursor 23 located on the left side will be described. When the pressing area PA is within the predetermined limit region 2131, the cursor 23 is moved from the left side around the pressing area PA to the right side (may be moved clockwise or counterclockwise) so as to enable the user to select the object 222 within the predetermined limit region 213 1 conveniently. In addition, when the pressing area PA leaves the predetermined limit region 2131 and is moved to the third predetermined range 213, the cursor 23 is still located on the right side around the pressing area PA. When the pressing area PA is moved to the predetermined limit region 2132, the cursor 23 is moved from the right side around the pressing area PA to the left side so as to enable the user to select the object 222 within the predetermined limit region 2132 conveniently. In addition, such a method does not disable the user from selecting the object 222 between the third predetermined range 213 and the predetermined limit regions 2131, 2132.

Herein, only two disposition strategies are provided for implementation, but the invention is not restricted to the disposition strategies mentioned hereinabove. In addition, the disposition strategy changes the cursor 23 according to the location of the pressing area PA, and may also change the cursor 23 according to the location of the cursor 23. Because the operation mechanisms are similar, detailed descriptions thereof will be omitted.

As shown in FIG. 3, the touch input method of this embodiment further includes the steps of: judging whether the cursor 23 is located within one of the objects 222 or not; judging whether an allowable range of the pressing area PA is pressed at least one time or not within a predetermined time when the cursor 23 is located within one of the objects 222; and executing the object 222, at which the cursor 23 is located, when the allowable range of the pressing area PA is pressed at least one time within the predetermined time. In this embodiment, the user can execute the object 222 at which the cursor 23 is located by pressing/clicking the touch panel module 21 at least one time within the allowable range of the pressing area PA.

The invention does not intend to restrict the aspect of the allowable range, and the allowable range even may be changed by the user dynamically. For example, the allowable range may be set to be the zone obtained by shrinking or expanding the pressing area PA. For example, the allowable range may be set to shrink to 80% of the size of the original zone of the pressing area PA or expand to 120% of the size of the original zone of the pressing area PA. In addition, the allowable range may also be defined as the area pressed by the user. For example, when the user moves the pressing area PA with his/her finger, the cursor 23 is stopped at the desired object 222. Then, the pressing area PA is again clicked within the predetermined time and the pressed area in this click is greater than 50% of the pressing area PA so that the object 222 corresponding to the cursor 23 may be executed. Of course, this percentage is adjustable. In addition, the predetermined time may be changed by the user dynamically as above mentioned. In other words, the sensitivity of the touch input method is adjustable.

Figure 8:
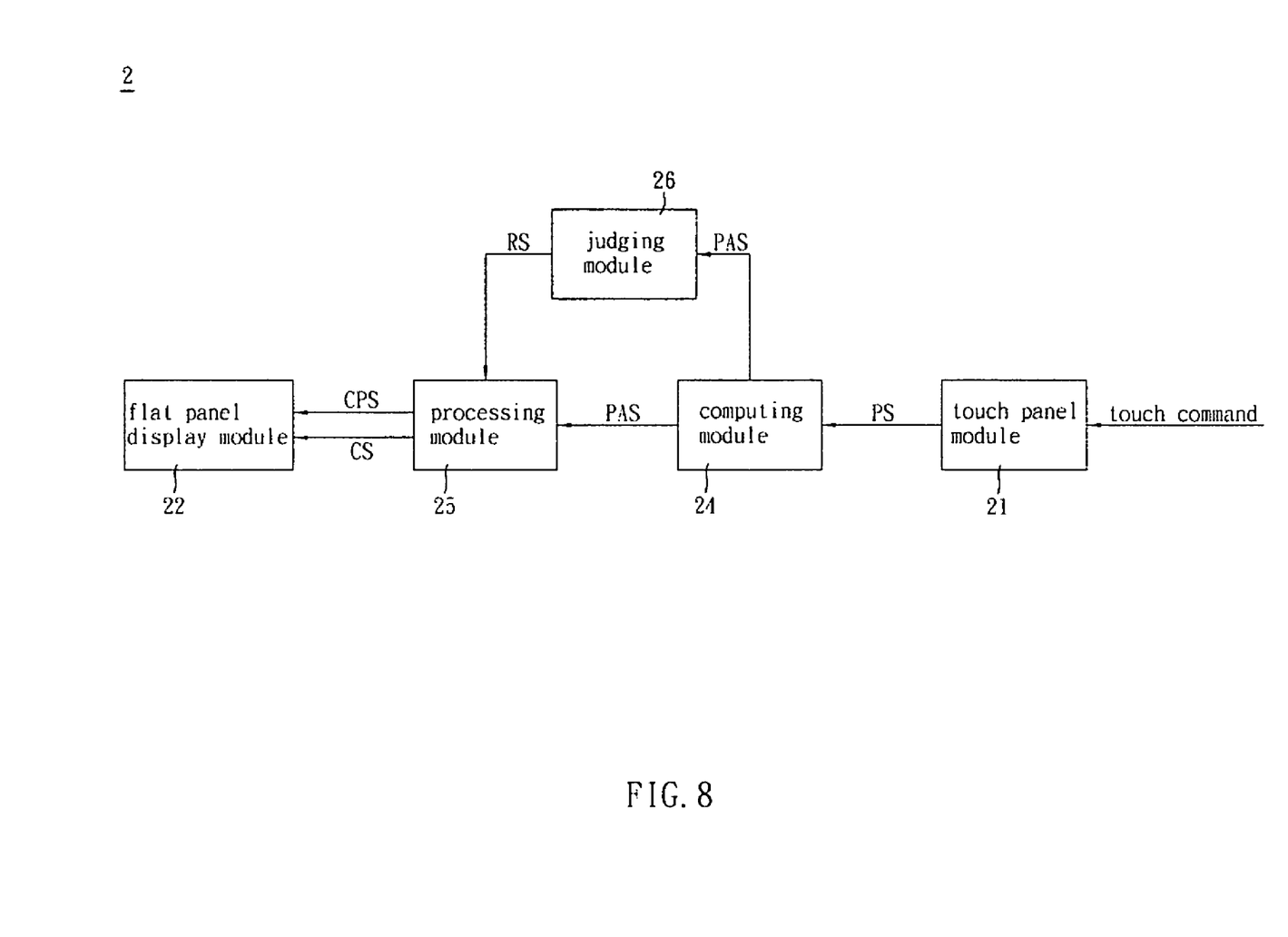
FIG. 8 is a block diagram showing the portable terminal apparatus according to the preferred embodiment of the invention.

The portable terminal apparatus 2 of this embodiment may further be described with reference to FIG. 8. In addition to the touch panel module 21 and the flat panel display module 22, the portable terminal apparatus 2 further includes a computing module 24, a processing module 25 and a judging module 26. The computing module 24 is connected to the touch panel module 21 and the processing module 25. The judging module 26 is connected to the computing module 24 and the processing module 25. The processing module 25 is connected to the flat panel display module 22.

When the user touches the touch panel module 21 by his/her finger or any other objects (e.g., a stylus), the touch panel module 21 receives the touch command, produces a position signal PS, and transmits the position signal PS to the computing module 24. The computing module 24 conducts the range computation according to the position signal PS to derive a pressing area signal PAS corresponding to one pressing area PA, which corresponds to the zone pressed by the user, and transmits the pressing area signal PAS to the processing module 25 and the judging module 26. The processing module 25 produces a cursor signal CS according to the pressing area signal PAS and transmits the cursor signal CS to the flat panel display module 22. The flat panel display module 22 displays a cursor within the predetermined range PR (see FIG. 3) around the pressing area PA according to the cursor signal CS.

In addition, the judging module 26, which has the ability to analyze the disposition strategy, judges the position of the pressing area PA corresponding to the pressing area signal PAS according to the disposition strategy within, for example, the first predetermined range 211 or the second predetermined range 212, as shown in FIG. 6, and produces a range signal RS transmitted to the processing module 25. The processing module 25 produces a cursor position signal CPS according to the range signal RS and transmits the cursor position signal CPS to the flat panel display module 22, which displays the cursor 23 on the right side or the left side around the pressing area PA according to the cursor position signal CPS.

In this embodiment, the computing module 24 and the judging module 26 may be implemented through software or a chip. In addition, the computing module 24 and the judging module 26 may also be combined with the processing module 25 and implemented by a chip, such as a central processing unit (CPU) or a micro controller unit (MCU).

In summary, the cursor is produced near the pressing area in the touch input method and the portable terminal apparatus according to the invention. Thus, when the user presses and moves the touch panel, the object can be selected precisely and accurately via the cursor. Thus, compared with the prior art, the invention can eliminate difficulties in user-guided touch-controlled cursor movements such as the incapability of precisely pressing/clicking the desired object. In addition, the invention does not require the stylus, so the invention can effectively save the cost, enable the user to operate the device more conveniently, and thus enhance the efficiency of use.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch input method applied to a portable terminal apparatus, the touch input method comprising the steps of:
   receiving a touch command;
   deriving a pressing area by conducting a range computation corresponding to the touch command;
   producing a cursor according to the touch command; and
   judging whether the pressing area is located within a first predetermined range or a second predetermined range, and the first predetermined range and the second predetermined range are on the same screen;
   disposing the cursor on a right side around the pressing area when the pressing area is located within the first predetermined range;
   disposing the cursor on a left side around the pressing area when the pressing area is located within the second predetermined range;
   judging whether a location of the cursor is within a predetermined coordinate limit of the first predetermined range or not;
   moving the cursor from the right side around the pressing area to the left side when the location of the cursor is within the predetermined coordinate limit;
   judging whether a location of the cursor is within a predetermined coordinate limit of the second predetermined range or not; and
   moving the cursor from the left side around the pressing area to the fight side when the location of the cursor is within the predetermined coordinate limit.

2. The method according to claim 1, wherein the cursor is moved with movement of the pressing area.

3. The method according to claim 1, further comprising the steps of:
   judging whether a location of the pressing area is within a predetermined coordinate limit of the first predetermined range or not; and
   moving the cursor from the right side around the pressing area to the left side when the location of the pressing area is within the predetermined coordinate limit.

4. The method according to claim 1, further comprising the steps of:
   judging whether a location of the pressing area is within a predetermined coordinate limit of the second predetermined range or not; and
   moving the cursor from the left side around the pressing area to the right side when the location of the pressing area is within the predetermined coordinate limit.

5. The method according to claim 1, further comprising the steps of:
   judging whether the cursor is located within one of objects or not
   judging whether an allowable range of the pressing area is pressed at least one time or not within a predetermined time when the cursor is located within one of the objects; and
   executing the object at which the cursor is located when the allowable range of the pressing area is pressed at least one time within the predetermined time.

6. The method according to claim 1, wherein the range computation computes the pressing area according to coordinate limits corresponding to the touch command.

7. The method according to claim 1, wherein the first predetermined range and the second predetermined range respectively define a left portion and a right portion of an operation frame of the flat panel display module.

8. The method according to claim 7, wherein the left portion and the right portion are symmetric to each other, the left portion is from the center to the left edge of the operation frame, and the right portion is from the center to the right edge of the operation frame.

9. A portable terminal apparatus, comprising:
   a touch panel module for receiving a touch command and producing a position signal;
   a computing module, which is connected to the touch panel module and conducts a range computation according to the position signal to derive a pressing area signal corresponding to a pressing area;
   a flat panel display module disposed corresponding to the touch panel module;
   a processing module, which is connected to the flat panel display module and the computing module, and transmits a cursor signal to the fiat panel display module, wherein the flat panel display module displays a cursor inside a predetermined range around the pressing area according to the cursor signal; and
   a judging module, which is connected to the computing module and receives the pressing area signal, for judging whether the pressing area corresponding to the pressing area signal falls within a first predetermined range or a second predetermined range, and producing a range signal, and the first predetermined range and the second predetermined range are on the same screen,
   wherein the processing module is connected to the judging module and receives the range signal to produce a cursor position signal, and the flat panel display module displays the cursor on a right side or a left side around the pressing area according to the cursor signal,
   wherein the judging module judges whether a location of the cursor is within a predetermined coordinate limit of the first predetermined range or not, and the flat panel display module displays the move of the cursor from the right side around the pressing area to the left side when the location of the cursor is within the predetermined coordinate limit,
   wherein the judging module judges whether a location of the cursor is within a predetermined coordinate limit of the second predetermined range or not; and the flat panel display module displays the move of the cursor from the left side around the pressing area to the right side when the location of the cursor is within the predetermined coordinate limit.

10. The portable terminal apparatus according to claim 9, wherein the first predetermined range and the second predetermined range respectively define a left portion and a right portion of an operation frame of the flat panel display module.

11. The portable terminal apparatus according to claim 10, wherein the left portion and the right portion are symmetric to each other, the left portion is from the center to the left edge of the operation frame, and the right portion is from the center to the right edge of the operation frame.

* * * * *